United States Patent
Darroman et al.

(10) Patent No.: US 8,049,362 B2
(45) Date of Patent: Nov. 1, 2011

(54) VEHICLE INVERTER

(75) Inventors: Yann Darroman, Barcelona (ES); Albert Trenchs Magana, Valls (ES); Pere Lopez Veraguas, Valls (ES)

(73) Assignee: Lear Corporation, Southfield, MI (US)

( * ) Notice: Subject to any disclaimer, the term of this patent is extended or adjusted under 35 U.S.C. 154(b) by 344 days.

(21) Appl. No.: 12/410,593

(22) Filed: Mar. 25, 2009

(65) Prior Publication Data

US 2010/0054010 A1 Mar. 4, 2010

Related U.S. Application Data

(60) Provisional application No. 61/092,951, filed on Aug. 29, 2008.

(51) Int. Cl.
*H02J 1/12* (2006.01)
(52) U.S. Cl. ............ 307/46; 307/45; 180/65.31; 290/50
(58) Field of Classification Search .................... 307/45, 307/46, 10.1, 10.7; 290/50; 320/134; 180/65.31; 318/139, 375
See application file for complete search history.

(56) References Cited

U.S. PATENT DOCUMENTS

| | | | |
|---|---|---|---|
| 5,297,015 A | | 3/1994 | Miyazaki et al. |
| 5,373,195 A | * | 12/1994 | De Doncker et al. ........... 307/45 |
| 5,680,302 A | | 10/1997 | Iwata et al. |
| 6,087,818 A | | 7/2000 | Hughes |
| 6,331,365 B1 | * | 12/2001 | King .................. 429/9 |
| 6,703,719 B1 | * | 3/2004 | McConnell ..................... 290/52 |
| 6,791,850 B2 | | 9/2004 | Pai et al. |
| 6,927,607 B2 | | 8/2005 | Choi et al. |
| 7,058,484 B1 | | 6/2006 | Potega |
| 7,595,597 B2 | * | 9/2009 | King et al. .................... 318/139 |
| 2007/0081372 A1 | | 4/2007 | Zeng et al. |

* cited by examiner

*Primary Examiner* — Shawn Riley
(74) *Attorney, Agent, or Firm* — Brooks Kushman P.C.

(57) ABSTRACT

A method and system of inverting DC energy stored within a vehicle to AC energy sufficient for supplying appliances or other devices that traditionally receive AC energy from a wall outlet. The inverting may be executed without feedback control in that switching operations used to controller boosting and inverting the DC energy are controller solely from inputs and without regard to the actual output.

20 Claims, 4 Drawing Sheets

VEHICLE INVERTER

CROSS-REFERENCE TO RELATED APPLICATIONS

This application claims the benefit of U.S. provisional application Ser. No. 61/092,951 filed Aug. 29, 2008.

BACKGROUND OF THE INVENTION

1. Field of the Invention

The present invention relates to vehicle inverters of the type that facilitate inverting vehicle provided DC energy to AC energy.

2. Background Art

Non-electric vehicles, such as but not limited to those driven solely by internal combustion engines, typically include a DC battery to support storage of a supply of DC energy. Vehicle operating conditions, however, can cause energy supplied from the battery to vary. When DC energy is inverted to AC energy for powering sensitive appliances, even relatively minor variation in the DC energy can lead to unstablized output when an inverter continuously adapts its operation according to output variations since there may be some lag in how quickly adjustments can be made. In some scenarios, by the time the adjustment has been made, the input may have varied such that a recently corrected variation is no longer sufficient. Inverters that rely on output feedback to control switching operations, therefore, are particularly difficult to control, and can be unstable, when the input DC energy tends to vary, even it the variance is slight.

Hybrid electric vehicles (HEVs) and other electric vehicles (EVs) that support regenerative braking, automatic engine stop/start operation, and the like, tend to introduce even more voltage variations into vehicle electrical systems. FIG. 1 illustrates a graph 10 of electrical variations commonly associated with HEV and EV technology and its result on battery voltage. The graph generally illustrates electrical variations influencing capabilities of a vehicle battery to provide a constant 12.8V. One variation may result from battery discharge during acceleration, another variation may result from battery charging during deceleration (regeneration), another variation may result from automatic engine shut-down after vehicle stop, another variation may result from battery discharge during a vehicle stop phase, another variation may result from hot engine restart or engine start/stop during engine standstill, and yet another variation may results from controlled battery charging.

The voltage variations in non-electric and electric vehicles can be problematic and disruptive to the inversion process used to invert DC energy to AC energy.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
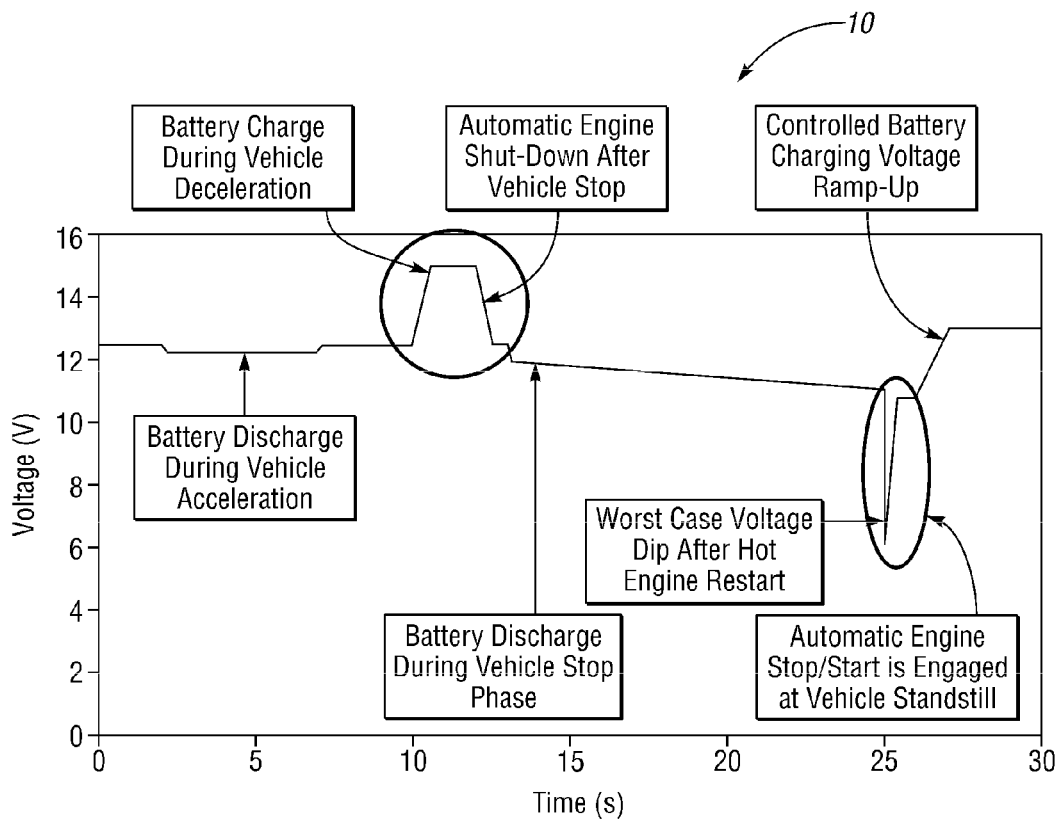
FIG. 1 illustrates a graph of electrical variations commonly associated with HEV and EV technology and its result on battery voltage.
Figure 2:
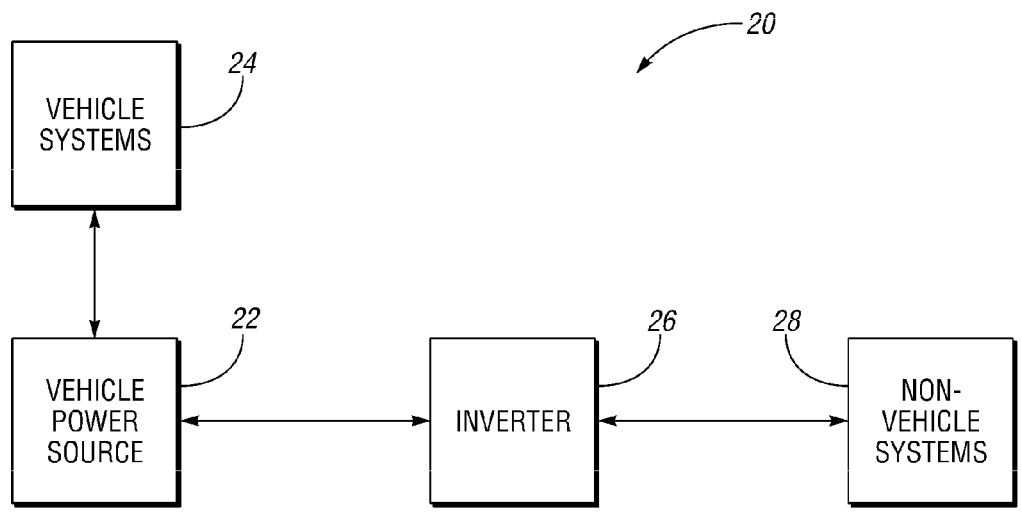
FIG. 2 illustrates a vehicle system in accordance with one non-limiting aspect of the present invention.

FIG. 2 illustrates a vehicle system 20 in accordance with one non-limiting aspect of the present invention. The vehicle system 20 is shown with respect to an automobile for exemplary purposes. The present invention is not necessarily limited to automobiles and may apply to other types of vehicles or devices that rely on different types of power. The system schematically illustrates a power distribution arrangement that may be used within any type of electric or non-electric vehicle where vehicle power is provided from a vehicle power source 22 to one or more vehicle systems 24 and where the vehicle power is inverted by an inverter 26 to application power suitable for powering one or more non-vehicle systems 28.

The present invention contemplates differentiating between vehicle power and appliance power for the sake of illustration and without intending to limit the scope and contemplation of the present invention. The vehicle power is intended to encompass power typically used to energize vehicle related systems, such as but not limited to air condition, entertainment, steering, braking, and the like, that rely on direct current (DC) at a particular voltage. The appliance power is intended to encompass power typically used to energize non-vehicle related system, such as but not limited to those that traditionally receive power from a wall outlet, like televisions, coolers, and others that rely on alternating current (AC).

The non-vehicle related systems may be portable or other types of devices having usage outside of the vehicle, e.g., devices of the type that are not permanently affixed to the vehicle's electrical system. The present invention, however, contemplates an arrangement where the non-vehicle related systems, at least as described herein, may actually be vehicle based systems that are permanently attached to the vehicle and rely on AC power instead of the DC power typically used by the vehicle related systems.

The vehicle power source 22 used to power the vehicle and non-vehicle systems 24, 28 may be a DC battery of the type commonly used in vehicles, such as a 12V or 42V DC alkaline battery. The battery 22 may be charged with an alternator (not shown) or other device. In hybrid or electric vehicles, the battery 22 may be charged with regenerative braking or other means. Optionally, the vehicle power may be stored and/or provided directly to the vehicle systems and non-vehicle systems without storage by a battery or capacitor.

Regardless of the source 22 supplying the vehicle power, one non-limiting aspect of the present invention contemplates the use of an inverter 26 to adapt the vehicle power to a form suitable for use with non-vehicle systems 28. This generally includes inverting the vehicle power 22 to non-vehicle power, referred to above as appliance power. This may include increasing or decreasing voltage, phase, frequency, etc. of the vehicle power. For exemplary purposes, the present invention is predominately described with respect to the vehicle systems 24 operating on DC power and the non-vehicle systems 28 operating on AC power, requiring the inverter 26 to transform the DC vehicle power to some form of AC appliance power.

The inverter 26 may be included within a housing (not shown) mounted anywhere in the vehicle. The inverter 26, for example, may include an outlet (not shown) on a exposed front of a dashboard or within another exposed area of the vehicle so that removable devices can be easily connected to it. A cover may be included to cover an outlet socket and to provide a relatively uniform dashboard appearance when the cover is closed. Wires (not shown) may be use to deliver vehicle power 22 to the inverter 26 and to deliver appliance power from the inverter 26, such as for delivery to other outlet sockets and/or vehicle systems. An earth wire may be included to provide feedback of the leakage current, such as to facilitate safety and other measurements.

Figure 3:
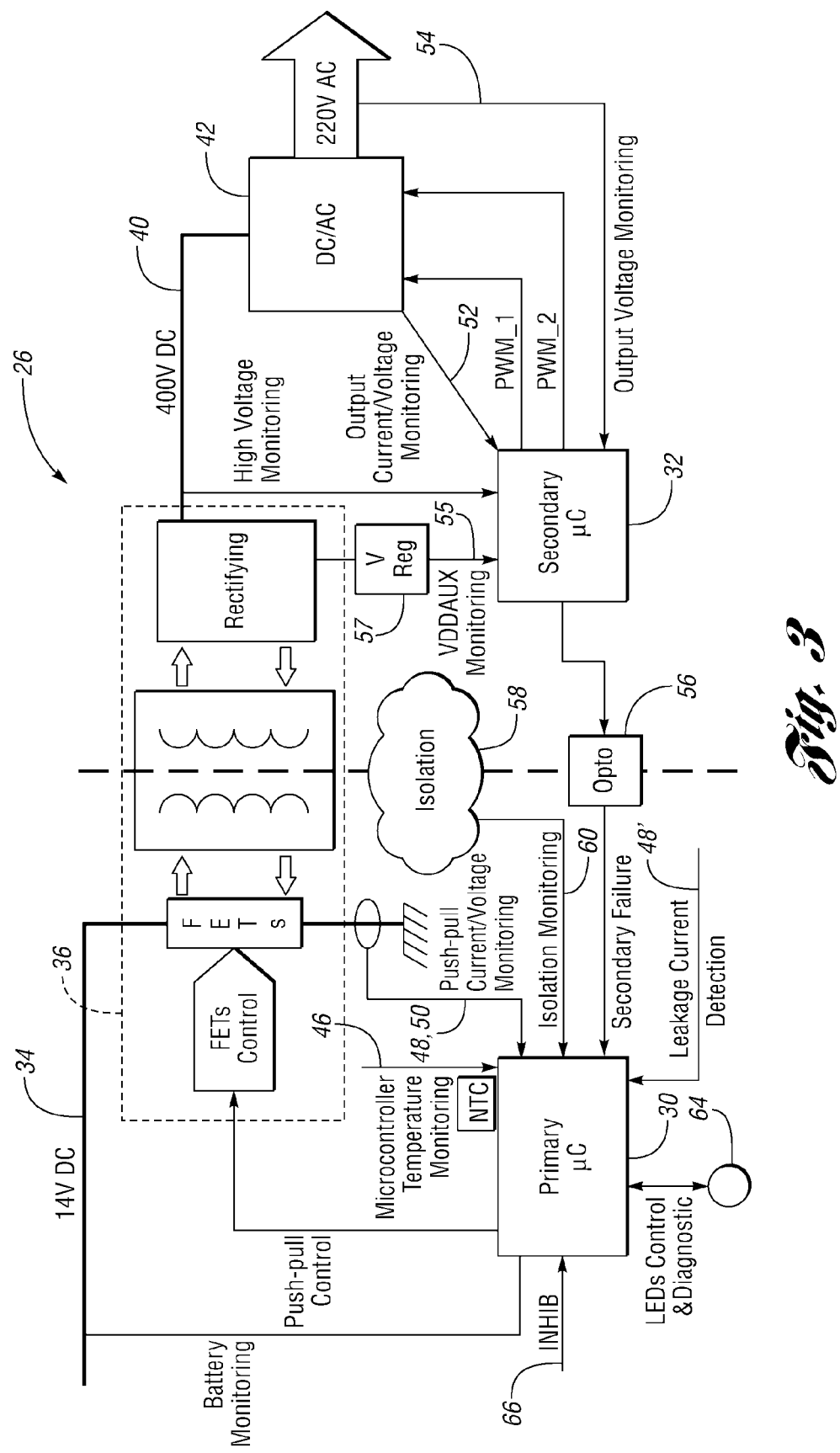
FIG. 3 illustrates an inverter in accordance with one non-limiting aspect of the present invention.

FIG. 3 schematically illustrates the inverter 26 in accordance with one non-limiting aspect of the present invention. The inverter 26 may include a primary and secondary controller 30, 32 configured to support open-loop control necessary to support manipulating the vehicle power into the appliance power. As shown, the vehicle power is provided at 14VDC over a first line 34 to a DC/DC converter 36. The primary controller 30 measures the incoming voltage 34 and sets a duty cycle or pulse width modulation (PWM) to boost the inputted voltage. These controls signals may be communicated from the controller to FETs and/or other switching elements of the converter 36, depending on the configuration of the DC/DC converter 36, which for exemplary purposes is shown to be a push-pull converter.

The present invention contemplates an open-loop only control strategy where the output of the DC/DC converter 36 goes unmeasured by the primary controller 30. The controller 30 may be configured to set the necessary controls signals to achieve a desired output according to the incoming voltage 34. As such, the control signals may be varied according to the incoming voltage but they are not varied according to the outputted voltage. A closed-loop system, wherein the outputted voltage is used to set the control systems, may be used but it is believed that the described system is more cost effective. The closed-loop system would require hardware dedicated to the processing the feedback and adjusting the controls signals. One the power side, a closed-loop system will required further bulky and expensive components like an output push-pull filter coil, as well as twice the number of electrolytic capacitors used as a primary differential filter. Moreover, closed-loop system can become unstable according to the load and other variations that could affect the outputted voltages that the closed-loop system would try to counteract with constant variations—leading to the potential instability described above.

Rather than relying of feedback controls, one non-limiting aspect of the present invention contemplates instead relying on a second, subsequent stage of open-loop control to be provided by the secondary controller 32. The secondary controller 32 may be configured to measure the voltage outputted from the DC/DC converter on a line 40 and to set controls signals for a subsequent DC/AC inverter 42 used to manipulate the stepped-up DC voltage to an AC voltage suitable to support the non-vehicle systems, i.e., it manipulates the stepped-up voltage into the desired appliance voltage. The staggered converter 36 and inverter 40 are an improvement over a single DC/AC, direct process since such a system would require a 50 Hz transformer, which are far too big, expensive and heavy to think of integrating them into an automotive power system.

The secondary controller 32 may provide the open-loop control in a manner similar to the primary controller 30 in that it controls the DC/AC inverter 40 without measuring or otherwise assessing the outputted AC voltage—its control is solely based on the inputted, stepped-up voltage 40 outputted from the DC/DC converter 36. This arrangement of primary and secondary side open-loop control eliminates the need for dedicated hardware processes and support.

In addition to the noted open-loop control, the inverter 26 may include some feedback or sensing to support non-control relates operations. For example, temperature sensors 46 may be placed in close proximity to the DC/DC converter 36 to sense operating temperatures. Should temperatures exceed or fall below a pre-defined threshold, the controller 30 may shutdown continued operations and warn the other controller 32, such as by communicating an error signal to the non-fault detecting controller. Current and voltage monitoring 48, 50, 52, 54 may also be performed on the primary and secondary sides in an effort to detect error conditions, such as by monitoring push-pull current and leakage current. Auxiliary voltage monitoring 55 may be separately performed to monitor auxiliary voltage output to DC loads requiring a stabilized, and in some cases boosted, DC voltage from a voltage regulator 57.

One non-limiting aspect of the present invention contemplates electrically isolating the primary and secondary sides and using an opto-coupler 56 or other non-contact electrical connect to support primary-secondary side based communications. An isolation cloud 58 is illustrated to highlight optional primary and secondary side isolation. The isolation may be used to completely isolate the battery voltage from the hazardous secondary side voltage (>50Vdc) in order that system supplied by the battery cannot be affected by the high voltage. Isolation monitoring 60 may also be performed to detect a failure in the electrical isolation of the primary and secondary stages.

Any detected errors may be communicated to vehicle passengers with LEDs 64 mounted proximate the outlet socket. The primary controller 30 may communicate signals for selectively illuminating the LEDs 64 as a function of the detected errors. INHIB 66 may be an on/off signal that is sent over a vehicle LIN bus in order for the inverter 26 to be switched on or off. Optionally, the primary and/or secondary controllers 30, 32 may be configured to support CAN or LIN based communications. This type of diagnostic communication may be helpful in integrating inverter operations with other vehicle operations.

Figure 4A:
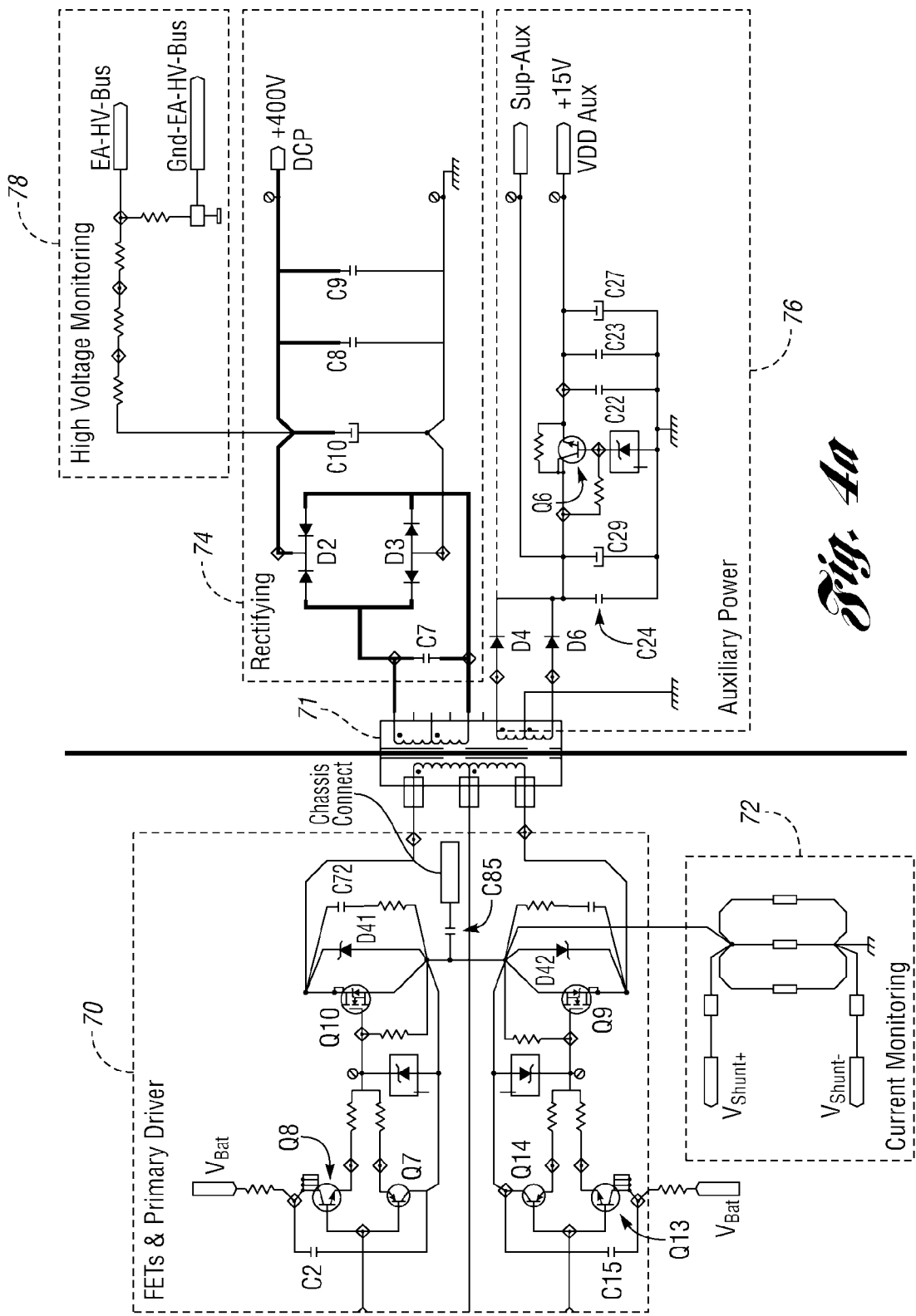
FIGS. 4a-4b illustrate switching components of the inverter in accordance with one non-limiting aspect of the present invention.
Figure 4B:
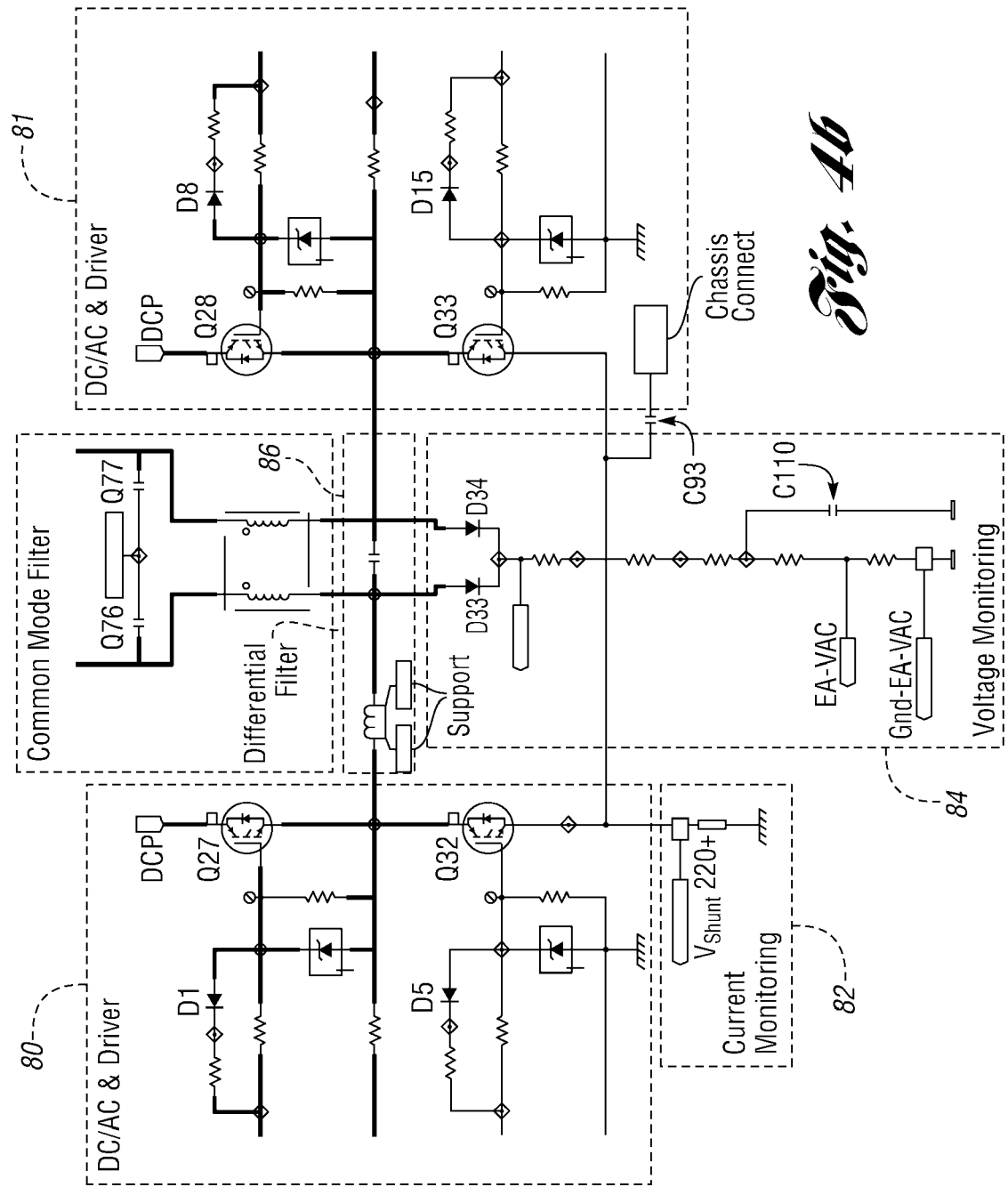

FIGS. 4a-4b detail switching components used to support the switching operations necessary to support boosting and inverting the DC energy from the battery in accordance with one non-limiting aspect of the present invention. FIG. 4a illustrates the primary stage having a FET and primary driver portion 70 comprised of switching elements Q7, Q8, Q9, Q10, Q13 and Q14 that operate with other passive components (generally listed as capacitors C, resistors R, and diodes D) to facilitate boosting DC input Vbat_f from a vehicle battery bus according to signals received from the primary controller 30. A current monitoring portion 72 may correspond with the current monitoring 48 on a primary side of a transformer 71. A rectifying portion 74 manages output DCP of a secondary side of the transform 71 that is output to the secondary stage at approximately 400VDC. An auxiliary power portion 76 may be included to output a substantially constant low voltage DC signal of approximately 15VDC, such as to facilitate powering sensitive low voltage loads. A voltage monitoring portion 78 may correspond with voltage monitoring 50 for monitoring voltage on the secondary side of the transformer 71.

FIG. 4b illustrates the secondary stage having DC/AC control and driver portions 80, 81 comprised of switching elements Q27, Q28, Q32 and Q33 that operate with other passive components (generally listed as capacitors C, resistors R, and diodes D) to facilitate inverting DC output DCP according to signals received from the secondary controller 32. Current and voltage monitoring portions 82, 84 may respectively correspond with current and voltage monitoring 52, 54 for monitoring AC current output. A filter portion 86 filters the AC output.

As illustrated, output of both of the primary stage and secondary stage are monitored to assess over and under current, voltage, and/or temperatures. A combination of these measurements may also be used to calculate over and under power conditions, such as by multiplying the second stage current by the second stage voltage. These output measurements, however, are not used by the controllers 30, 32 to adjust or otherwise control the switching operations.

As noted above, the present invention may be helpful as vehicles are becoming increasingly accommodated to the use of passenger electronic convenience devices within the vehicle. For a vehicle system to accommodate a personal convenience device that utilizes AC power, the vehicle system must convert the DC voltage to an AC voltage. The inverter may be configure so that a true sine wave (THD<8%) or a modified sine wave (MSW) is output to a load. Rather, these values may be used to shutdown operations of the primary stage, secondary stage, and/or the auxiliary stage (while not shown in FIG. 4b, the secondary controller may be configured to monitor the auxiliary portion 76 for over and under voltage/current conditions).

One non-limiting aspect of the present invention may relate to a device to supply selectable domestic AC power from the DC supply in a vehicle. The solution proposed can be integrated into any platform supplied from a 12 Vdc battery or having a 12 Vdc network available. It also considers Waterproof and dustproof requirements. As regards monitoring, it measures voltage, current and power at input and output, temperature, isolation and output leakage.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An inverter for use in a vehicle having a DC energy supply, the inverter comprising:
   a primary stage within the housing configured to boost a first DC output of the DC energy supply to a second DC output, wherein the primary stage controls switching operations of a number of switching devices used to facilitate boosting the first DC output to the second DC output according to measurement of the first DC output and independent of a feedback measurement of the second DC output;
   a secondary stage within the housing configured to invert the second DC output to an AC output, wherein the secondary stage controls switching operations of a number of switching devices used to facilitate inverting the second DC output into the AC output according to measurement of the second DC output and independent of measurement of the AC output;
   wherein the primary stage includes a primary controller within the housing configured to control switching operations of the primary stage based on measurement of the first DC output;
   wherein the secondary stage includes a secondary controller within the housing configured to control switching operations of the secondary stage based on measurement of the second DC output; and
   wherein the secondary controller is unable to communicate measurement of the second DC output to the primary controller.

2. An inverter for use in a vehicle having a DC energy supply, the inverter comprising:
   a primary stage within the housing configured to boost a first DC output of the DC energy supply to a second DC output, wherein the primary stage controls switching operations of a number of switching devices used to facilitate boosting the first DC output to the second DC output according to measurement of the first DC output and independent of a feedback measurement of the second DC output;
   a secondary stage within the housing configured to invert the second DC output to an AC output, wherein the secondary stage controls switching operations of a number of switching devices used to facilitate inverting the second DC output into the AC output according to measurement of the second DC output and independent of measurement of the AC output;
   wherein the primary stage includes a primary controller within the housing configured to control switching operations of the primary stage based on measurement of the first DC output;
   wherein the secondary stage includes a secondary controller within the housing configured to control switching operations of the secondary stage based on measurement of the second DC output; and
   wherein the secondary controller is electrically isolated from the primary controller.

3. An inverter for use in a vehicle having a DC energy supply, the inverter comprising:
   a primary stage within the housing configured to boost a first DC output of the DC energy supply to a second DC output, wherein the primary stage controls switching operations of a number of switching devices used to facilitate boosting the first DC output to the second DC output according to measurement of the first DC output and independent of a feedback measurement of the second DC output;
   a secondary stage within the housing configured to invert the second DC output to an AC output, wherein the secondary stage controls switching operations of a number of switching devices used to facilitate inverting the second DC output into the AC output according to measurement of the second DC output and independent of measurement of the AC output;
   wherein the primary stage includes a primary controller within the housing configured to control switching operations of the primary stage based on measurement of the first DC output;
   wherein the secondary stage includes a secondary controller within the housing configured to control switching operations of the secondary stage based on measurement of the second DC output; and
   wherein the primary stage includes a voltage monitoring circuit configured to output a voltage measurement of the second DC output to the primary controller and the primary controller is configured to shutdown the primary stage in the event the voltage measurement of the second DC output is greater than an upper threshold and in the event the voltage measurement of the second DC output is less than a lower threshold.

4. The inverter of claim 3 wherein the secondary stage includes a voltage monitoring circuit configured to output a voltage measurement of the AC output to the secondary controller and the secondary controller is configured to shutdown the secondary stage in the event the voltage measurement of the AC output is greater than an upper threshold and in the event the voltage measurement of the AC output is less than a lower threshold.

5. The inverter of claim 4 wherein the primary stage includes a current monitoring circuit configured to output a current measurement of the second DC output to the primary controller and the primary controller is configured to shutdown the primary stage in the event the current measurement of the second DC output is greater than an upper threshold and in the event the current measurement of the second DC output is less than a lower threshold.

6. The inverter of claim 5 wherein the secondary stage includes a current monitoring circuit configured to output a current measurement of the AC output to the secondary controller and the secondary controller is configured to shutdown the secondary stage in the event the current measurement of the AC output is greater than an upper threshold and in the event the current measurement of the AC output is less than a lower threshold.

7. The inverter of claim 6 wherein the primary stage includes a temperature monitoring circuit configured to output a temperature measurement of the switching devices of the primary stage to the primary controller and the primary controller is configured to shutdown the primary stage in the event the temperature measurement is greater than an upper threshold and in the event the temperature measurement is less than a lower threshold.

8. The inverter of claim 7 wherein the secondary controller includes algorithm that generates a power estimate for the AC output based on the current and on voltage measurements of the AC output and the secondary controller is configured to shutdown the secondary stage in the event the power estimate is greater than an upper threshold and in the event the power estimate is less than a lower threshold.

9. The inverter of claim 8 wherein each of the primary and secondary controllers output an error signal to a vehicle data bus responsive to a shutdown of at least one of the primary and secondary stages.

10. The inverter of claim 9 further comprising an opto-coupler configured to receive the error signal as an analog signal from one of the primary or secondary controllers and to enable bi-directional signal transfer between the primary and second controller.

11. The inverter of claim 2 wherein the secondary controller outputs a first pulse width modulation (PWM) signal and a second PWM signal to respectively control switching operations directed by first and second drivers used to signal first and second insulated gate bipolar transistors (IGBTs).

12. The inverter of claim 2 wherein switching operations of the number of switching devices of the secondary stage are controlled such that the AC output is one of 230V/60 Hz, 220V/60 Hz, and 110V/60 Hz.

13. An inverter for use in a vehicle having a DC battery, the inverter comprising:
 a primary stage configured to boost a first DC output of the DC battery to a second DC output, wherein the primary stage automatically adjusts the boosting of the first DC output according to measurement of the first DC output and without measurement of the second DC output;
 a secondary stage configured to invert the second DC output to an AC output, wherein the secondary stage automatically adjusts the inverting of the second DC output according to measurement of the second DC output and without measurement of the AC output; and
 wherein the primary stage is electrically isolated from the secondary stage.

14. The inverter of claim 13 further comprising a primary controller configured to control switching operations of the primary stage associated with adjusting the boosting of the first DC output based on measurement of the first DC output and a secondary controller configured to control switching operations of the secondary stage associated with adjusting the inverting of the second DC output based on measurement of the second DC output, wherein the primary controller is electrically isolated from the secondary controller.

15. A method of inverting a first DC output of approximately 12VDC from a DC energy supply included with a vehicle to an AC output of at least 110VAC/60 Hz, the method comprising:
 automatically boosting the first DC output to a second, greater DC output of approximately 400VDC, including automatically controlling switching operations of a number of switching devices used to facilitate the boosting according to measurement of the first DC output and without measurement of the second DC output; and
 automatically inverting the second DC output to the AC output of at least 110VAC/60 Hz, including automatically controlling switching operations of a number of switching devices used to facilitate the inverting according to measurement of the second DC output and without measurement of the AC output.

16. The method of 15 claim further comprising controlling the switching operations used to facilitate the boosting with a primary controller that is electrically isolated from and communicatively coupled to a secondary controller that controls switching operations used to facilitate the inverting.

17. The method of claim 16 further comprising shutting down the boosting when the primary controller determines the second DC output to be greater than an upper threshold and when the primary controller determines the second DC output to be less than a lower threshold, and the method further comprises shutting down the inverting when the secondary controller determines the AC output to be greater than an upper threshold and when the secondary controller determines the AC output to be less than a lower threshold.

18. The inverter of claim 14 wherein the primary controller communicates and the secondary controller communicate through in opto-coupler, thereby permitting electrically isolated communications between the primary stage and the secondary stage.

19. The inverter of claim 2 wherein the primary controller communicates and the secondary controller communicate through in opto-coupler, thereby permitting electrically isolated communications between the primary stage and the secondary stage.

20. The method of claim 16 further comprising:
 at least one of the primary and secondary controllers outputting an error signal in response to a shutdown of the at least one of the primary and secondary stages; and
 communicating the error signal through an opto-coupler configured to enable electrically isolated, bi-directional signal transfer between the primary and second controller.

* * * * *